United States Patent
Ferrara et al.

(10) Patent No.: US 10,216,954 B2
(45) Date of Patent: Feb. 26, 2019

(54) PRIVACY DETECTION OF A MOBILE APPLICATION PROGRAM

(71) Applicant: International Business Machines Corporation, Armonk, NY (US)

(72) Inventors: Pietro Ferrara, Mestre-Venice (IT); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 15/193,293

(22) Filed: Jun. 27, 2016

(65) Prior Publication Data

US 2017/0372095 A1 Dec. 28, 2017

(51) Int. Cl.
*G06F 21/62* (2013.01)
*H04W 12/02* (2009.01)
*G06N 99/00* (2019.01)
*G06F 21/55* (2013.01)

(52) U.S. Cl.
CPC ........ *G06F 21/6245* (2013.01); *G06F 21/552* (2013.01); *G06F 21/556* (2013.01); *G06N 99/005* (2013.01); *H04W 12/02* (2013.01)

(58) Field of Classification Search
CPC ...... G06F 21/6245; G06F 21/62; G06F 21/60; G06N 99/005; H04W 12/02
See application file for complete search history.

(56) References Cited

U.S. PATENT DOCUMENTS

| | | | |
|---|---|---|---|
| 9,158,935 B2 | 10/2015 | Livshits et al. | |
| 2007/0168987 A1* | 7/2007 | Vetillard | G06F 11/3608 717/126 |
| 2010/0131969 A1 | 5/2010 | Tidwell et al. | |

(Continued)

FOREIGN PATENT DOCUMENTS

CN    104504337 A    4/2015

OTHER PUBLICATIONS

Anonymously; "System, Method and Apparatus for Posing Leakage Queries in Free Text with Applications in Mobile Security"; Jul. 9, 2014, pp. 1-4, http://ip.com/IPCOM/000237755.

(Continued)

*Primary Examiner* — Ayoub Alata
(74) *Attorney, Agent, or Firm* — Scully, Scott, Murphy & Presser, PC; Daniel P. Morris, Esq.

(57) ABSTRACT

Privacy violation detection of a mobile application program is disclosed. Regular histories of the mobile application are mined. A call-graph representation of the mobile application program can be created and sequences of events of interest according to the platform specification of the mobile application can be collected. A plurality of learnable features are extracted from the regular histories. The plurality of learnable features are combined into a single feature vector which is fed into a machine-learning-based classification algorithm. Whether the mobile application program includes one or more permissions for accessing unauthorized privacy data of a mobile application user is determined based on a machine learning classification of the single feature vector. The collected sequences can be reduced into a plurality of feature vectors which can include at least one of a happens-before feature and a multiplicity of occurrences feature.

17 Claims, 3 Drawing Sheets

(56) References Cited

U.S. PATENT DOCUMENTS

| | | |
|---|---|---|
| 2010/0312768 A1 | 9/2010 | Shear et al. |
| 2013/0097660 A1 | 4/2013 | Das et al. |
| 2015/0082430 A1* | 3/2015 | Sridhara ............... G06F 21/552 726/23 |

OTHER PUBLICATIONS

Anonymously; "Analytic Forecasting of Future Electronic Cyber Threats with Deep Learning and Coevolutionary Strategies"; Oct. 28, 2015, pp. 1-6, http://ip.com/IPCOM/000243925.
Hornyac, et al., "These Aren't the Droids You're Looking For", , CCS '11 Proceedings of the 18th ACM conference on Computer and communications security, Oct. 2011, pp. 639-652, http://research.microsoft.com/pubs/149596/AppFence.pdf.
Jung et al., "TaintDroid: Realtime Privacy Monitoring on Smartphones", Overview Publications Demo Source Code FAQ, Apr. 14, 2016, , pp. 1-2, http://appanalysis.org/.
Guarnieri et al., "Saving the World Wide Web from Vulnerable JavaScript", ISSTA '11, Jul. 17-21, 2011, pp. 177-187.
Tripp et al., "TAJ Effective Taint Analysis of Web Applications", PLDI '09, Jun. 15-20, 2009, pp. 1-11.
Tripp et al., "A Bayesian Approach to Privacy Enforcement in Smartphones", Aug. 2014, SEC '14 Proceedings of the 23rd USENIX conference on Security Symposium, pp. 175-190.
List of IBM Patents or Patent Applications Treated As Related dated Sep. 18, 2018, pp. 2.

* cited by examiner

PRIVACY DETECTION OF A MOBILE APPLICATION PROGRAM

BACKGROUND OF THE INVENTION

This disclosure is directed to privacy violation detection of a mobile application program.

Applications for mobile devices frequently demand access to private information. This includes unique device and user identifiers, such as the phone number or IMEI number (identifying the physical device); social and contacts data; the user's location; audio (microphone) and video (camera) data; etc.

While private information often serves the core functionality of a mobile application, it may also serve other purposes, such as advertising, analytics or cross-application profiling. From the outside, the user is typically unable to distinguish legitimate usage of their private information from illegitimate scenarios, such as sending of the IMEI number to a remote advertising website to create a persistent profile of the user.

Existing platforms provide limited protection against privacy threats. Both the Android and the iOS platforms mediate access to private information via a permission model. Each permission is mapped to a designated resource and the platform holds the permission for all application behaviors and resource accesses.

In Android®, permissions are given or denied at installation time. In iOS, permissions are granted or revoked upon first access to the respective resource. Hence, both platforms cannot disambiguate legitimate from illegitimate usage of a resource once an application is granted the corresponding permission.

The shortcomings of mobile platforms in ensuring user privacy have led to a surge of research on real time privacy monitoring. Two main approaches have been proposed, which are both brittle.

One technique in this research is information-flow tracking, often in the form of taint analysis. Private data, such as data obtained via privacy sources (e.g. TelephonyManager.getSubscriberId( ) which reads the device's IMSI) is labeled with a taint tag denoting its source. The tag is then propagated along data-flow paths within the code. Any such path that ends up in a release point, or privacy sink (e.g. WebView.loadUrl( . . . ), which sends out an HTTP request) triggers a leakage alarm. The tainting approach effectively reduces leakage judgments to boolean reachability queries. This approach is challenged by covert channels and implicit flows, as well as if the data is transformed in custom ways. These challenges are not merely theoretical, but occur in practice (e.g. in malware and in ad libraries).

Another technique that has recently been proposed is a data-centric analysis in which only privacy sources and sinks are monitored without tracking intermediate flow steps between the source and sink statements. Privacy enforcement is based on a comparison between the values arising at the source and sink points. This enables elimination of false positives if only a small amount of data from the source ends up reaching the sink. Also, some of the instrumentation overhead is obviated, though there is still the need to instrument source and sink APIs. A limitation of this approach is that certain values arising both at the source and at the sink are in fact benign, leading to false alarms. Yet another limitation is that this approach cannot handle custom data transformations, but only standard encryption/encoding/hashing schemes (e.g. SHA-1 or Base64 encoding).

Both of the above existing approaches are limited due to their focus on dataflow and/or data transformations. These are properties that are difficult to reason about directly, rendering both approaches brittle.

SUMMARY OF THE INVENTION

One embodiment of the invention includes a method for privacy violation detection of a mobile application program having a platform specification. The method can include mining regular histories of the mobile application program. The method can also include extracting a plurality of learnable features from the regular histories. The method can further include combining the plurality of learnable features into a single feature vector. The method can also include feeding the single feature vector into a machine-learning-based classification algorithm and determining whether the mobile application program includes one or more permissions for accessing unauthorized privacy data of a mobile application user based on a machine learning classification of the single feature vector.

The mining regular histories can include creating a callgraph representation of the mobile application program and collecting sequences of events of interest according to the platform specification. The extracting a plurality of learnable features from the regular histories can includes reducing the collected sequences into a plurality of feature vectors. The method can include determining that there are of loops and recursive calls in the mobile application program and abstracting the collected sequences of the loops and recursive calls as regular expressions over the events of interest. The reducing the collected sequences into feature vectors can include at least one of a happens-before feature and a multiplicity of occurrences feature. The mining regular histories may include statically mining an abstract representation of execution traces as regular expressions over security-relevant operations.

Another embodiment can include a system comprising at least one data processor connected to at least one memory that stores software instructions, where execution of the software instructions by the at least one data processor causes the system to detect a privacy violation of a mobile application program having a platform specification by mining regular histories of the mobile application program, extracting a plurality of learnable features from the regular histories, combining the plurality of learnable features into a single feature vector, feeding the single feature vector into a machine-learning-based classification algorithm and determining whether the mobile application program includes one or more permissions for accessing unauthorized privacy data of a mobile application user based on a machine learning classification of the single feature vector.

Another embodiment can include a computer program product comprising software instructions on a non-transitory computer-readable medium, where execution of the software instructions using a computer causes the computer to detect a privacy violation of a mobile application program having a platform specification by mining regular histories of the mobile application program, extracting a plurality of learnable features from the regular histories, combining the plurality of learnable features into a single feature vector, feeding the single feature vector into a machine-learning-based classification algorithm and determining whether the mobile application program includes one or more permissions for accessing unauthorized privacy data of a mobile application user based on a machine learning classification of the single feature vector.

DETAILED DESCRIPTION OF PREFERRED EMBODIMENTS

Figure 1:
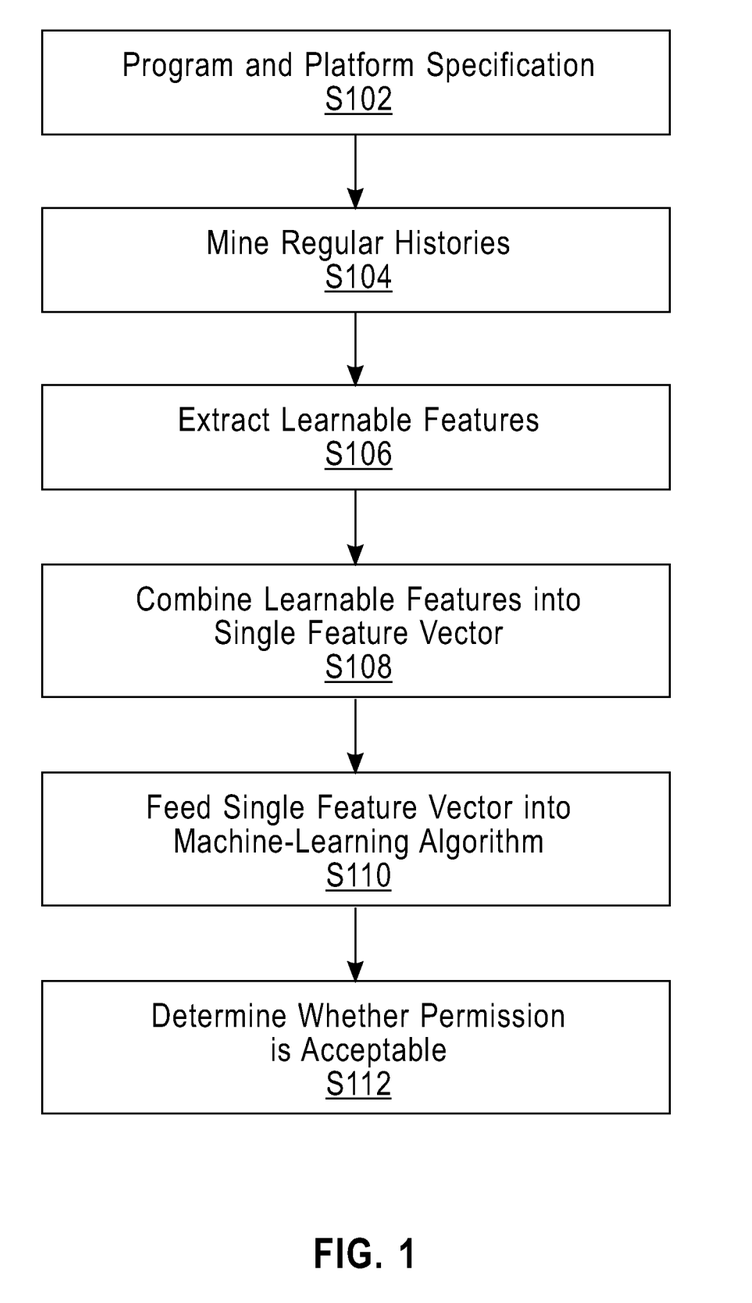
FIG. 1 is a flow chart illustrating one embodiment of the method of privacy violation detection of a mobile application program disclosed within this specification.

Shown in FIG. 1 are the steps of a method of one embodiment of the present invention for privacy violation detection of a mobile application program having a platform specification. The method starts in step S102 with a program P to be analyzed and a specification S of events of interest for the mobile platform of program P. In step S104 regular histories of the mobile application program P are mined. In step S106, a plurality of learnable features are extracted from the regular histories. In step S108, the plurality of learnable features are combined into a single feature vector. In step S110, the single feature vector is fed into a machine-learning-based classification algorithm. In step S112, the method concludes with determining whether the mobile application program P includes one or more permissions for accessing unauthorized privacy data of a mobile application user based on a machine learning classification of the single feature vector.

Figure 2:
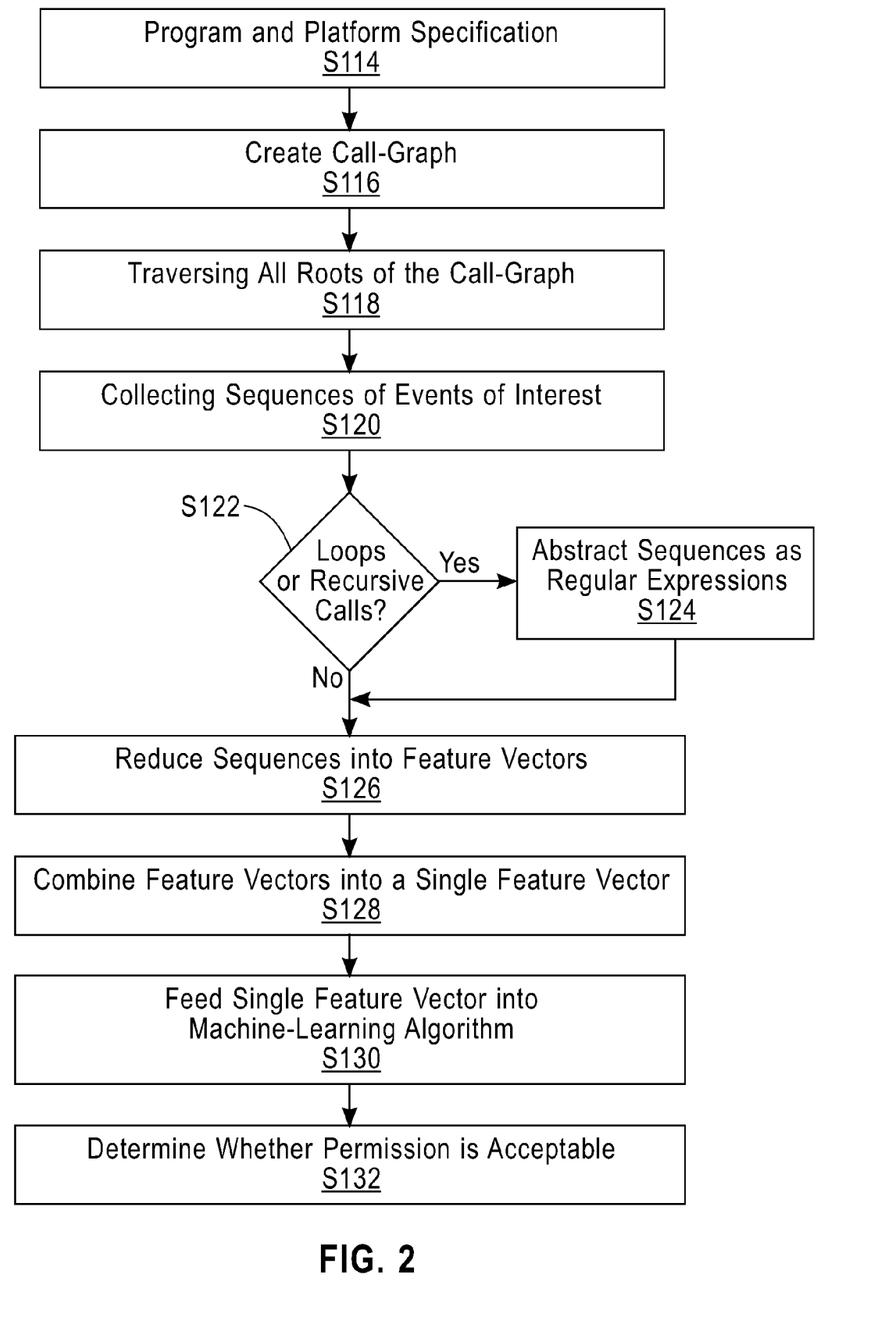
FIG. 2 is a flow chart illustrating another embodiment of the method of privacy violation detection of a mobile application program disclosed within this specification.

As shown in FIG. 2, the method, according to another embodiment of the invention, starts in step S114 with the program P to be analyzed and the specification S of events In step S116 regular histories are mined by creating a call-graph representation of program P. The call-graph representation in one embodiment captures live code and execution flows of program P. In step S118, the mining includes traversing all the roots of the call-graph. The roots of the call-graph are the entry points of the program. In step S120, the mining further includes collecting sequences of events of interest according to the specification S. The method determines in step S122 if there are loops and recursive calls in program P. If there are loops and/or recursive calls, YES in step S122, in step S124 the method performs abstracting the sequences as regular expressions over the events of interest and proceeds to step 126. If there are no loops and/or recursions, NO in step S122, the method proceeds directly to step S126. In step S126, learnable features are extracted by reducing the collected and abstracted sequences into feature vectors. In one embodiment, the feature vectors capture atomic facts about the sequence.

In one embodiment the reduced features include the happens-before relation between pairs of events. For example, fact (X,Y) if event X occurs before event Y in one or more sequences.

In one embodiment the reduced features include the multiplicity of occurrences of a given event. For example, (X,"MANY") if event X is executed in a loop in at least one sequence. Another example is (X,"ONE") if in none of the sequences X is executed more than once but there exists a sequence where X is executed; etc). In another embodiment are reduced features include both happens-before and multiplicity of occurrences type features.

In step S128, the method includes combining the extracted features into a single feature vector. For example, each possible (X,Y) or (X,"MANY"/"ONE"/"ZERO") fact is a boolean feature that occupies a designated offset into the single feature vector. In step S130, the method includes feeding the single feature vector into a machine-learning-based classification algorithm. The classification algorithm will have been previously been trained with labeled instances according to the process above.

In step S132, the learning algorithm determines whether, or to what degree, the behavior of the mobile application program is acceptable. Step S132 determines whether the mobile application program is requesting permission to access privacy data of the mobile application user based on a machine learning classification of the single feature vector.

The method and system, in one embodiment, combines shallow code analysis, extracting event patterns along the program's execution flow, with statistical learning to distinguish the patterns that are most directly correlated with unauthorized information release. The method and system is able to reduce a program to thousands of different features related to its execution of security/privacy-relevant events.

The Table below lists the code for one example of a mobile application program for the Andriod® platform to be analyzed according to one embodiment of the invention.

TABLE

```
1  package com.android.providers.sms;
2  class SMSSendService {
3  private void a(d paramd) {
4  String str1 = paramd.f( );
5  String str2 = paramd.e( );
6  int i = Integer.valueOf(paramd.g( )).intValue( );
7  SmsManagerlocalSmsManager=SmsManager.getDefault( );
8  PendingIntent localPendingIntent =
9  PendingIntent.getBroadcast(this ,0,new Intent ( ),0);
10 for ( int j = 0; j < i ; j++) {
11 (1000*(1+new Random( ).nextInt(3)));
12 Thread.sleep( j);
13 localSmsManager.sendTextMessage(str1,null, str2,
14 localPendingIntent, null); }}}
```

The code of the mobile application program in the Table is obfuscated and, as such, difficult to analyze manually. Yet a pattern that clearly emerges from this code is its sending of SMS messages in a loop with some sleep interval in between sending attempts. While obfuscation is effective at disguising the intention of the code, for example, getBroadcast ( ) and sendText Message ( ) calls of the mobile application program cannot be obfuscated as these are platform-level operations. Indeed, most relevant operations involve operating system APIs, and so the "fingerprint", or "signature," that results from executing such operations hints toward the nature of the code.

As noted above, in one embodiment the method first mines regular traces. In the case of the exemplary code for a mobile application program in the Table, that fingerprint, abstracted as a regular expression over the restriction of the execution trace to security-relevant operations, is simply getBroadcast sendTextMessage. This expression captures not only the involved operations, but also their order and multiplicity of execution.

Mining such regular abstractions statically requires traversal of the program's different control-flow paths, where the analysis collects relevant operations along each of the paths. Note that while the number of paths is potentially unbounded (in the presence of loops or recursive calls), a given program gives rise to finitely many regular histories, as these represent loops explicitly via the Kleene-star learning algorithm operator while abstracting away the number of iterations. Deciding which of the operations along a path is relevant is based on a specification. For the code shown in the Table, an exemplary specification was created for Android starting from the SuSi catalog of sources and sinks, choosing a subset of the APIs that occur most frequently in Android apps.

An advantage of mining regular histories rather than more expensive properties, such as data flow between operations is that the analysis is robust and scalable. Still, this form of analysis is not merely syntactic. As noted above, one embodiment includes the construction of a call-graph representation for the program. In addition, in one embodiment the analysis maintains, and manipulates, the set of regular histories interprocedurally. On the one hand, the analysis is efficient. On the other hand, the semantic fingerprint it collects is hard to bypass or distort. It consists of a semantic model of the program's control flow, combined with the collection of calls that target platform APIs and, as such, cannot be obfuscated.

As noted above the next step of the method is extracting learnable features. While regular histories capture valuable information, they are not directly machine learnable. These are complex objects, where formal learning algorithms feed on feature vectors. Such vectors often have a geometric interpretation or range over a finite domain.

Next, the regular histories of the program in the Table were reduced to two types of features.

The first type is a happens-before features. For each pair o, o' of (not necessarily distinct) security-relevant operations, the method and system creates the feature (o, o'), which is also sometimes represented as o→o'.

Instances due to the exemplary code in the Table are:

sendTextMessage → sendTextMessage
sendTextMessage → getBroadcast
getBroadcast → sendTextMessage The second type is a Multiplicity feature. A second set of features represents, for a given security-relevant operation o, whether o occurs zero, one or many times in a given sequence.

For the exemplary code in the Table, there are:
sendTextMessage•→>1 getBroadcast•→1

Given n relevant operations, the method obtains an overall set of $n^2+n$ features. Though mapping a trace to these features is a lossy translation, the features are still able to preserve significant information about the trace in the form of multiple simple properties that it models (e.g., that getBroadcast occurs before sendTextMessage).

As noted above the method next computes a classifier for the classification algorithm. A given application gives rise to multiple histories, which are joined into a single feature vector disjunctively. In one embodiment, a feature becomes enabled if at least one history derived from the application models it. Given training sets of malicious and benign applications, respectively, the method and system obtains a dataset for supervised training.

For robustness, in one embodiment, the method utilizes a meta-learning algorithm that consists of a diversified set of underlying algorithms representing different learning methods. These are each trained separately with 10-fold cross validation. Each of the algorithms is assigned a weight according to its accuracy during training. Then, given a new application, its respective feature vector is computed as described above. The determination whether the input application is malware is based on the weighted votes of the different algorithms constituting the meta classification algorithm.

In one exemplary embodiment, given a training set of approximately 300 good and 300 bad applications, the method according to the invention was able to distinguish whether a fresh application is good or bad with near-perfect precision (over 99% accuracy). This was based on a meta-learning classification algorithm, consisting of naive Bayes, Bayes net, logistic, voted perception, K-star, Ada boost, OneR and J48.

Figure 3:
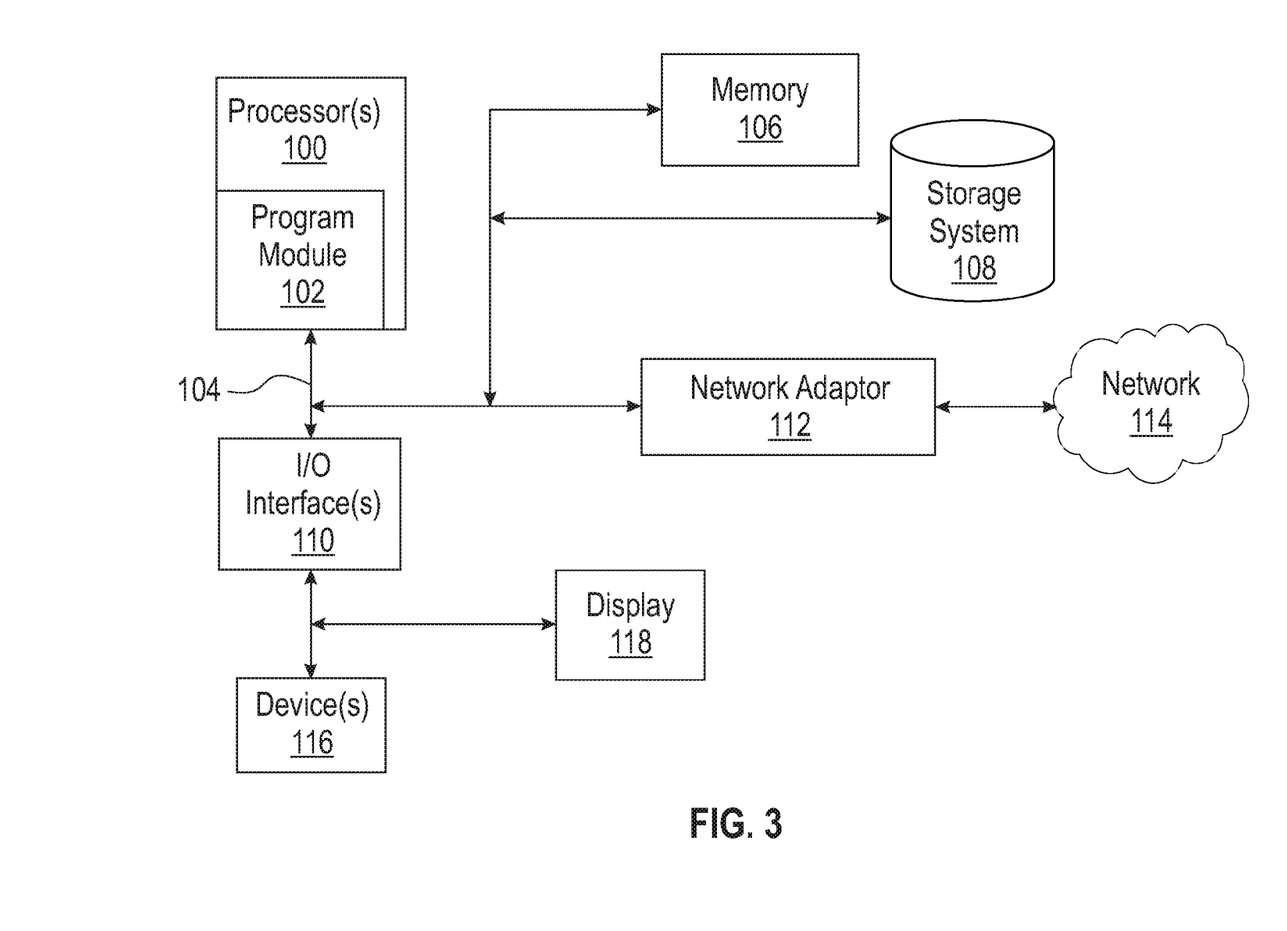
FIG. 3 is a block diagram of an exemplary computing system suitable for implementation of the embodiments of the invention disclosed in this specification.

FIG. 3 illustrates a schematic of an example computer or processing system that may implement the method for privacy violation detection of a mobile application program in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, mobile phones, smart phones, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for privacy violation detection of a mobile application program having a platform specification comprising:
   mining regular histories of security or privacy relevant operations based on the platform specification of the mobile application program;
   the mining regular histories comprising:
      creating a call-graph representation of the mobile application program;
      traversing all roots of the call-graph, the roots including the entry points of the mobile application program; and
      collecting sequences of the security or the privacy relevant operations according to the platform specification;
   extracting a plurality of learnable security or privacy relevant features from the mined regular histories;
   combining the plurality of learnable features into a single feature vector;
   feeding the single feature vector into a machine-learning-based classification algorithm; and
   determining whether the mobile application program includes one or more permissions for accessing unauthorized privacy data of a mobile application user based on a machine learning classification of the single feature vector.

2. The method of claim 1, wherein the extracting a plurality of learnable features from the regular histories includes reducing the collected sequences into a plurality of feature vectors.

3. The method of claim 1, wherein the mining regular histories includes statically mining an abstract representation of execution traces as regular expressions over security-relevant operations.

4. The method of claim 1, further including determining that there are loops and recursive calls in the mobile application program and abstracting collected sequences of the loops and recursive calls as regular expressions over the events of interest.

5. The method of claim 4, further including reducing the abstracted sequences into feature vectors.

6. The method of claim 2, wherein reducing the collected sequences into feature vectors includes at least one of a happens-before feature and a multiplicity of occurrences feature.

7. A system comprising:
   at least one data processor connected to at least one memory that stores software instructions, where execution of the software instructions by the at least one data processor causes the system to detect a privacy violation of a mobile application program having a platform specification by:
      mining regular histories of security or privacy relevant operations based on the platform specification of the mobile application program;
      the mining regular histories comprising:
         creating a call-graph representation of the mobile application program;
         traversing all roots of the call-graph, the roots including the entry points of the mobile application program; and
         collecting sequences of the security or privacy relevant operations according to the platform specification;

extracting a plurality of learnable security or the privacy relevant features from the mined regular histories;

combining the plurality of learnable features into a single feature vector;

feeding the single feature vector into a machine-learning-based classification algorithm; and determining whether the mobile application program includes one or more permissions for accessing unauthorized privacy data of a mobile application user based on a machine learning classification of the single feature vector.

8. The system of claim 7, wherein the extracting a plurality of learnable features from the regular histories includes reducing the collected sequences into a plurality of feature vectors.

9. The system of claim 8, further including determining that there are of loops and recursive calls in the mobile application program and abstracting collected sequences of the loops and recursive calls as regular expressions over the events of interest.

10. The system of claim 9, further including reducing the abstracted sequences into feature vectors.

11. The system of claim 9, wherein reducing the collected sequences into feature vectors includes at least one of a happens-before feature and a multiplicity of occurrences feature.

12. The system of claim 7, wherein the mining regular histories includes statically mining an abstract representation of execution traces as regular expressions over security-relevant operations.

13. A computer program product comprising:

software instructions on a non-transitory computer-readable medium, where execution of the software instructions using a computer causes the computer to detect a privacy violation of a mobile application program having a platform specification by:

mining regular histories of security or privacy relevant operations based on the platform specification of the mobile application program;

the mining regular histories comprising:

creating a call-graph representation of the mobile application program;

traversing all roots of the call-graph, the roots including the entry points of the mobile application program; and collecting sequences of the security or privacy relevant operations according to the platform specification;

extracting a plurality of learnable security or the privacy relevant features from the mined regular histories;

combining the plurality of learnable features into a single feature vector;

feeding the single feature vector into a machine-learning-based classification algorithm; and determining whether the mobile application program includes one or more permissions for accessing unauthorized privacy data of a mobile application user based on a machine learning classification of the single feature vector.

14. The computer program product of claim 13, wherein the extracting a plurality of learnable features from the regular histories includes reducing the collected sequences into a plurality of feature vectors.

15. The computer program product of claim 13, further including determining that there are of loops and recursive calls in the mobile application program and abstracting collected sequences of the loops and recursive calls as regular expressions over the events of interest.

16. The computer program product of claim 15, further including reducing the abstracted sequences into feature vectors, the feature vectors including at least one of a happens-before feature and a multiplicity of occurrences feature.

17. The computer program product of claim 13, wherein the mining regular histories includes statically mining an abstract representation of execution traces as regular expressions over security-relevant operations.

* * * * *